United States Patent [19]

Lipfert

[11] 4,032,127

[45] June 28, 1977

[54] PROTECTIVE HEAD GEAR AND BODY EQUIPMENT

[75] Inventor: Donald Ernest Lipfert, Woolwich, Maine

[73] Assignee: Deres Development Corporation, Greenwich, Conn.

[22] Filed: Feb. 4, 1974

[21] Appl. No.: 439,590

Related U.S. Application Data

[63] Continuation-in-part of Ser. Nos. 75,373, Sept. 25, 1970, Pat. No. 3,790,150, and Ser. No. 347,069, April 2, 1973.

[52] U.S. Cl. .................................... 267/151; 2/420

[51] Int. Cl.² .......................................... F16F 1/16

[58] Field of Search ................ 2/3 RV, 16 V, 22 V, 2/44 V, 45 V; 267/151

[56] References Cited

UNITED STATES PATENTS

| | | | |
|---|---|---|---|
| 3,153,792 | 10/1964 | Marietto | 2/3 R |
| 3,599,239 | 8/1971 | Tatum | 2/3 R |
| 3,735,418 | 5/1973 | Kavanagh | 2/3 R |

*Primary Examiner*—James B. Marbert
*Attorney, Agent, or Firm*—Edward Halle

[57] ABSTRACT

Protective equipment for the head, body, or the like, having at least one module comprising levers and displaceable bearing means.

14 Claims, 12 Drawing Figures

PROTECTIVE HEAD GEAR AND BODY EQUIPMENT

CROSS-REFERRENCE TO RELATED APPLICATIONS

This application is a continuation-in-part of copending U.S. patent application of Donald E. Lipfert for MECHANICAL SUPPORT SYSTEM, Ser. NO. 75,373, filed Sept. 25, 1970, issued as U.S. Pat. No. 3,790,150 on Feb. 5, 1974 the entire disclosure of which is incorporated herein by reference.

This application is also a continuation-in-part of copending U.S. patent application of Donald E. Lipfert for CUSHIONING MATERIAL CONSTRUCTION, Ser. No. 347,069, filed Apr. 2, 1973.

BACKGROUND OF THE INVENTION

The protective equipment of the invention, although it may take several forms as described herinbelow, is basically a construction comprising one or more modules, each having a grouping of displaceable bearing means in a system of inter-connected levers wherein displacement of one displaceable bearing means in one direction will displace another displaceable bearing means in another direction, with one or more of said modules being mounted in a system in a manner to utilize the cushioning, or force distributing effect of the construction in protective equipment such as helmets, pads, guards and shields. The term "displaceable bearing means" as used herein is synonymous with the term "displaceable load support means " as used in U.S. Pat. No. 3,790,150, it being understood that such bearing means may support a load or bear against a load or be a part of a system which supports a load against a surface or surfaces, or to generally bear against anything to distribute forces through the module comprising the lever system and the displaceable bearing means.

For example, it may be used as a shock absorbing means in head and body prroective equipment by providing a cushioning effect from an outside load or force directed against a body.

It is, therefore, an object of the present invention to provide a construction with cushioning and force distributing qualities for head and body protection.

It is a further object to provide such a construction which is readily adaptable to wearable and comfortable helmets and padding. A further object is to provide such a construction which may be used with existing styles of protective equipment. Various other objects and advantages will appear from the specification hereinbelow.

BRIEF DESCRIPTION OF THE INVENTION

The basic module cushioning concept has been disclosed in U.S. Pat. No. 3,790,150. The improvements set forth herein include its adaptation to protective equipment

DESCRIPTION OF THE DRAWINGS

U.S. Pat. No. 3,790,150 contains drawings numbered FIGS. 1 through 25. The specification herein has further accompanying drawings, in which

FIG. 12 is a sectional view of an alternate form of the invention showing a shoulder pad, or the like.

DETAILED DESCRIPTION OF THE INVENTION

Figure 1:
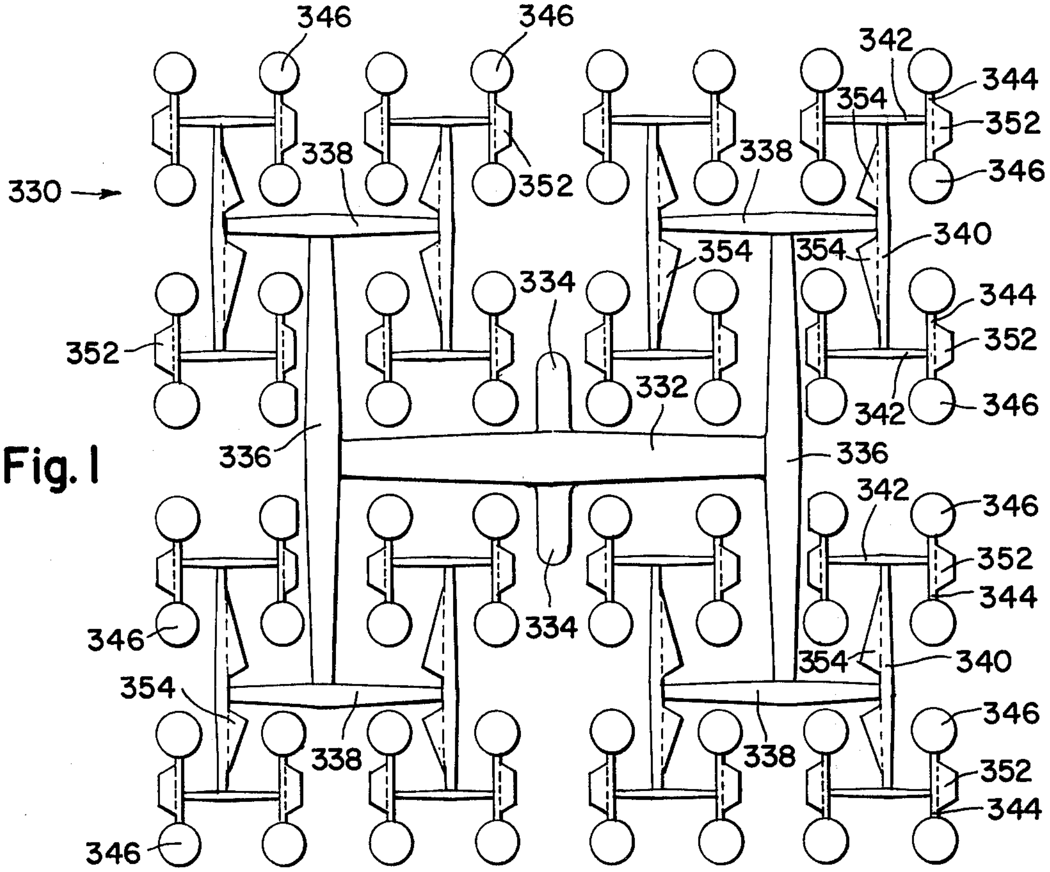
FIG. 1 is a top plan view of a module of the invention enlarged with relation to FIGS. 9, 10 and 12 described below.

A basic module of the invention has been illustrated in U.S. Pat. No. 3,790,150 at FIG. 1 (reference numeral 22), FIG. 5 and FIG. 6, and described therein.

Figure 2:
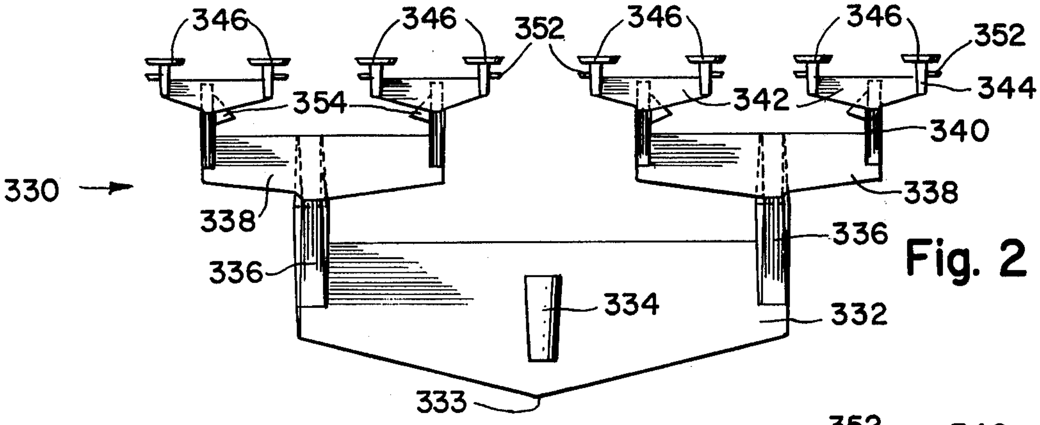
FIG. 2 is a side elevation of the module shown in FIG. 1.
Figure 3:
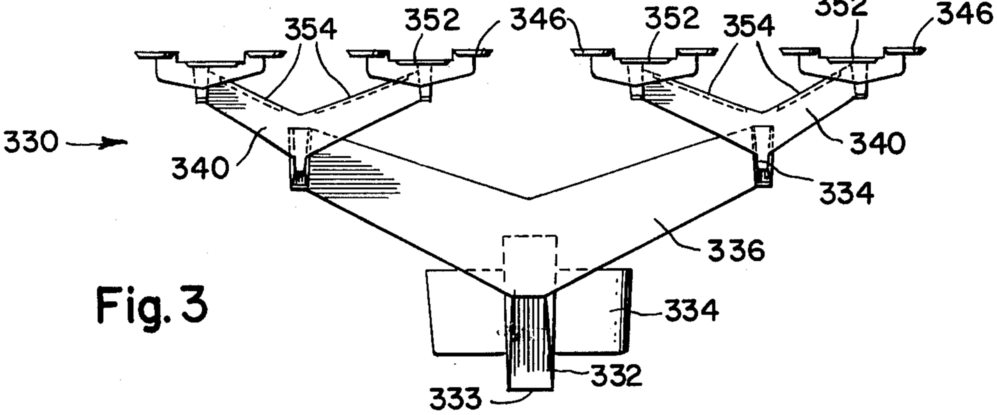
FIG. 3 is an end elevation of the module shown in FIG. 1.

An improved module with some modification is shown herein in FIGS. 1, 2 and 3 as module 330. Module 330 has a lower lever 332 having a pair of laterally extending torsion mounting lugs 334. Lever 332 is connected at each of its ends to central portions of levers 336 which, in turn, are connected at ends to levers 338 which, in turn, are connected at ends to levers 340, thence to levers 342, thence to levers 344 which, in turn, have displaceable bearing means 346 at their ends.

The particular construction of the module is in accordance with that disclosed in U.S. Pat. No. 3,790,150. However, there are some improvements disclosed in FIGS. 1, 2 and 3 herein which enhance the function and construction of the basic module of the invention. For example, the mounting lugs 334 may provide a standardized and positive means for mounting the modules 330 to various types of the construction, as will appear herein. The branched levers 332–344, inclusive, are shown with a taper from center toward end which maximizes the differential between their torsional and flexural stiffness to improve these qualities while minimizing the amount of material needed per module.

In module 330 the uppermost levers 344 are provided with displaceable bearing means 346 which extend above the levers 344. These first mentioned displaceable bearing means may be termed primary displaceable bearing means. They are shown in FIGS. 1–3 of the drawings as circular pads. However, they may be of any particular shape or configuration desirable for the intended end use.

Secondary bearings 352, as shown in FIGS. 1, 2 and 3 in the form of plates or pads may be placed on the upper portion of levers 344 on a plane somewhat lower than the plane of the first mentioned primary bearing means 346 and tertiary bearings 354 may similarly be placed along upper portions of levers 340. In such a design the stiffness of the module 330 increases as the load increases and the foam sheet 348 contacts first the secondary 352 and then the tertiary bearings 354. The primary bearing pads 346, as well as the secondary and tertiary bearing pads 352 and 354, are preferably made as large as possible within the construction to provide a maximum bearing area.

Figure 4:
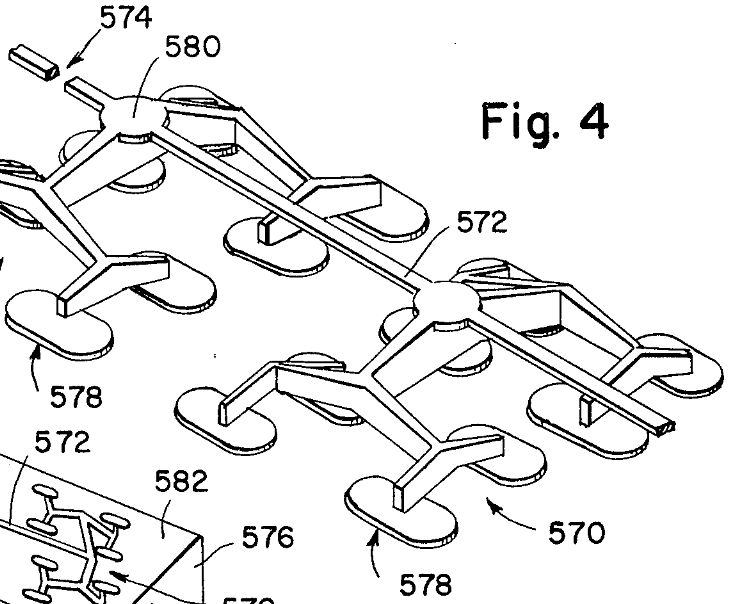
FIG. 4 is a perspective view.
Figure 5:
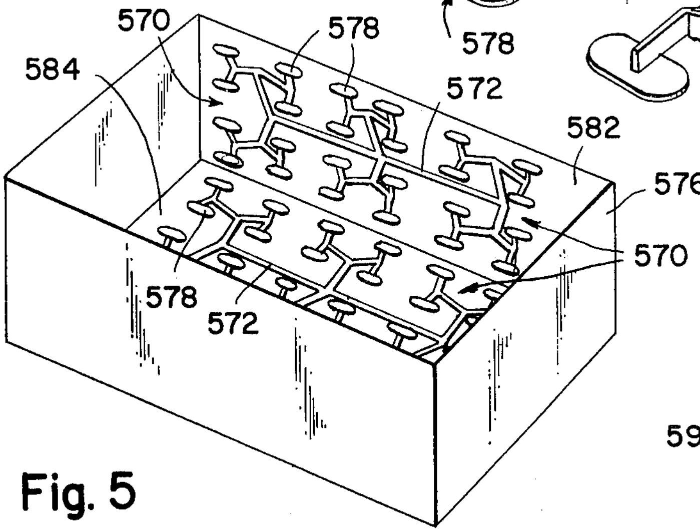
FIG. 5 is a perspective view.

General cushioning materials are shown in FIGS. 4 and 5 of the drawings. In FIG. 4 modules 570 are mounted along a continuous strip 572. The strip could be cut at any desired point such as point 574 to provide a strip having any number of modules 570. In FIG. 5 the strip 572 has been cut into lengths having three modules 570 to fit within the dimensions of a box 576. Either the strip 572 (or the bearing surfaces 578) can be provided with a coating pressure sensitive adhesive 580 so that the strip 572 can be placed against a package wall 582 and held for packing purposes (or, if desired, the bearings 578 can be secured to the package wall 582). In any case, the packaged load or item to be placed within, indicated at reference numeral 584, will be held inside the cushion formed by strips of modules 570. The load or item 584 is indicated by the arrow, but it can be anything which is subject to being packaged in a box or wrapped.

Figure 6:
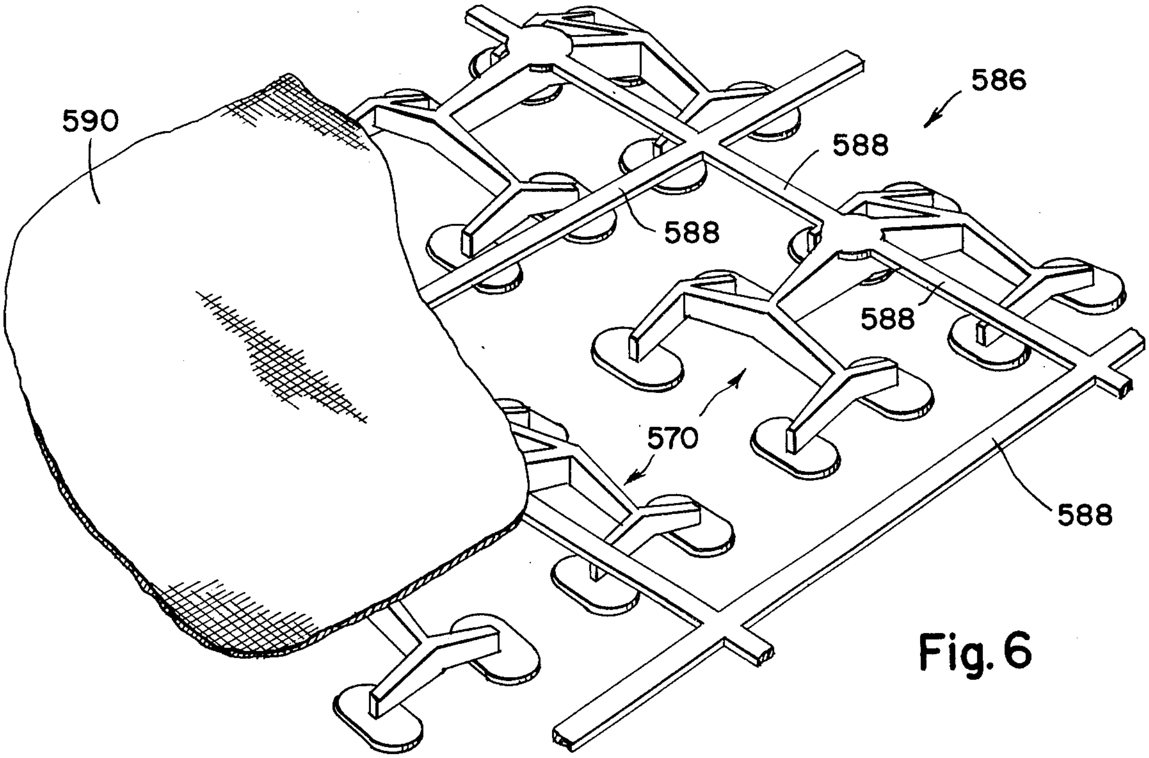
FIG. 6 is a perspective view.

In addition to providing continuous strips 572 formed with a single row of modules 570, a broader cushioning material 586 can be made up having grids 588 with modules 570 placed at regular or desired intervals (as in FIG. 6). Thus a cushioning material 586 having determinable length as well as determinable width can be made in large pieces which can be rolled and stored for future use. Such a roll could be unrolled much the same as fabric piece goods or rolls or wrapping paper and cut to a desired size.

Figure 7:
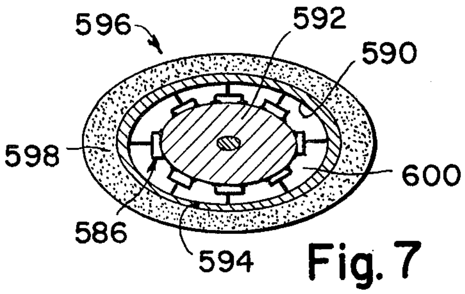
FIG. 7 is a sectional view.

Cushioning material 586 may be provided with a film or fabric backing 590, as shown in FIGS. 6 and 7.

The particular construction of modules for a headgear or helmet and protective equipment may be in accordance with that disclosed in U.S. Pat. No. 3,790,150.

General and special cushioning materials are shown in FIGS. 4–7 of the drawings. These materials comprise modules 570 of the invention.

Figure 8:
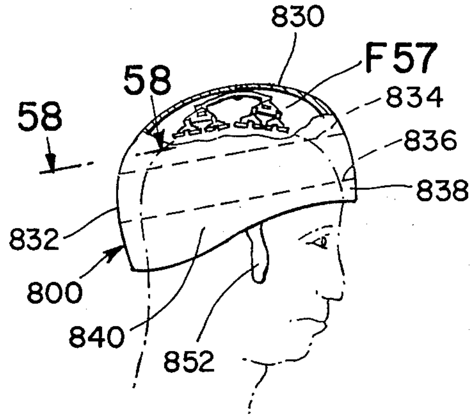
FIG. 8 is a side plan view with parts cut away in phantom.

FIG. 8 shows a protective headgear, or helmet, 800 incorporating the system of the invention.

Figure 9:
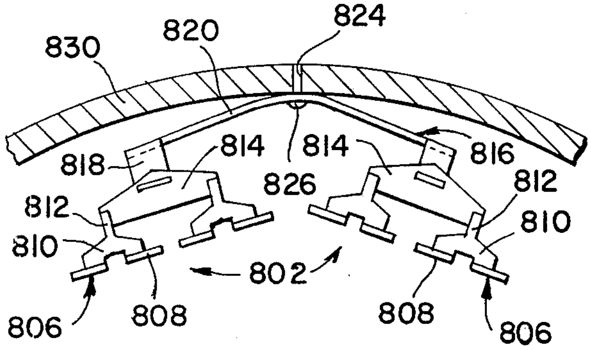
FIG. 9 is an enlarged detail of elements within the dotted line or at designated F 9 in FIG. 8.
Figure 10:
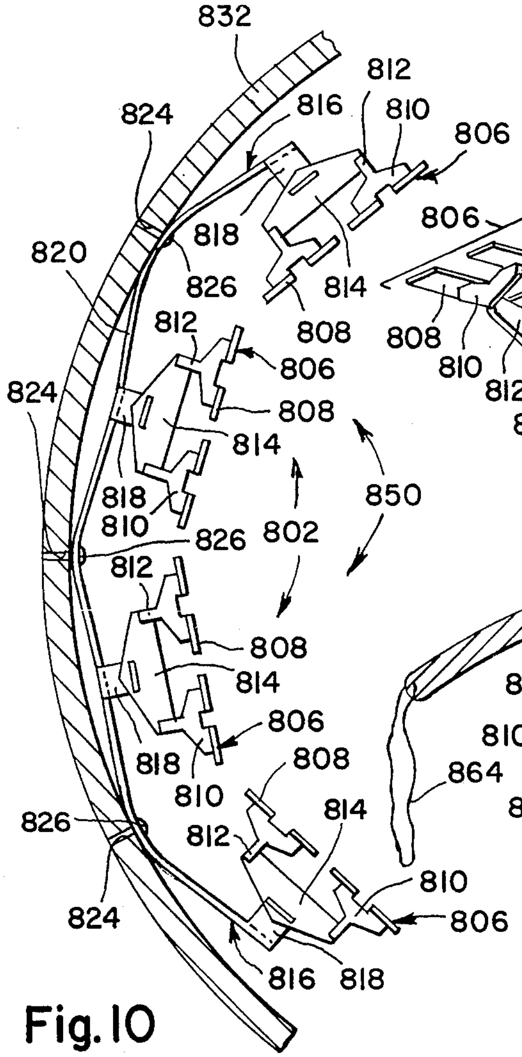
FIG. 10 is an enlarged detail cross section view from above along lines 10—10 in FIG. 8.
Figure 11:
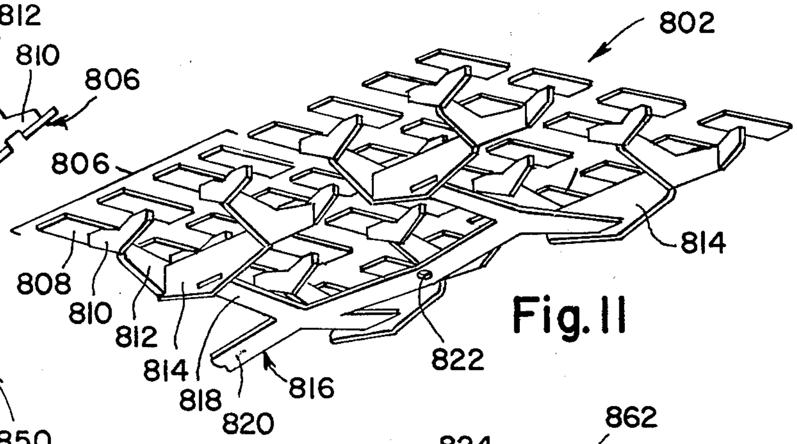
FIG. 11 is a perspective of modules of the invention.

The cushioning systems 802 comprises the module construction and connections as illustrated in FIGS. 9, 10 and 11 of the drawings.

In the preferred form of helmet 800 the modules 806 comprise displaceable bearing means 808 mounted on first levers 810, connected to second levers 812, connected to third levers 814, which in turn are connected to inserts 816.

The lever connections are made in accordance with the invention as described in U.S. Pat. No. 3,790,150 to provide for the torsion bushing action described therein. The preferred way is to provide torsion means in the modules by the use of a springy material for the levers. An end of one lever will twist to permit a connected lever to rotate on its fulcrum means. Thus the torsion means is the action of the springy material of the module levers.

A module may also include torsion means in the form of a torsion bushing 40 (as shown in FIG. 7 of U.S. Pat. No. 3,790,150), if desired.

The modules 806 are preferably molded in one piece. The third or lowermost lever 814 of module 806 is attached to connecting means such as insert means 816 at an insert arm 818 preferably by molding the lowermost lever 814 over the end arm 818. The arms 818 are preferably arranged in pairs emanating from the central body strip 820 of connecting means 816. Holes 822 are provided in the connecting means strip 820, and holes 824 are provided in the helmet 800 through which rivets, or other fastening elements, 826 are inserted to fasten the connecting means 816 to the helmet 800, as shown in FIGS. 9 and 10.

Connecting means 816 may be of any desired length to hold any desired number of modules 806. In FIG. 9 (at the crown 830 of helmet 800) the connecting means 816 has two pairs of arms 818 to hold four modules 806, and in FIG. 10 (the rear end 832 of helmet 800) has a connecting means 816 long enough for four pairs of arms 818 to hold eight modules 806. Each module 806 in the preferred form has eight displaceable bearings 808 and measures about 1.5 inches square at the plane formed by the bearings 808.

Reference to FIG. 8 shows dotted imaginary lines 834 and 836 which roughly correspond to the head band of the helmet. Several connecting means, such as means 820, are lined up within the circumference of the band 834, 836 inside the helmet 800 to form a protective band within the helmet 800, which preferably include the inner portions of the front 838, sides 840 and rear 832 of the helmet 800.

Only one section of this portion of a head gear protector is shown in FIG. 10 of the drawings where a double row of modules affixed to eight connecting arms 818 (eight modules in all) are shown at the rear portion of a head band area (note lines 834 and 836 in FIG. 8). This group of modules, designated by reference numeral 850 in FIG. 10, thus forms a portion of a head seating means for the helmet 800 which is positioned where the normal hat head band would be positioned. It may however be somewhat wider than a hat head band. The full head band area around the head of the wearer may be completed by furnishing connecting means 820 of suitable length, together with modules 806 around the inner circumference of the helmet 800. This can also be done by supplying a single long connecting means 816 long enough to fit all the way around the inside of the helmet. In the preferred form a number of such connecting means are used to group about 28 modules 806 in a double row around the inside to form a head seating means for the helmet 800. Such a head seating means provides the protective cushioning around the head of the wearer. In some applications the head gear need not be a complete helmet, or need it have modules around the entire inner circumference of the helmet, and in such case any desired number of modules may be included.

The connecting means and its connecting arms are preferably made of plastic or metal which has some springyness. The modules are molded to arms 818 which form insert ends and, as described hereinbelow, the connecting means serves as a mounting base for the modules. By making connecting means inserts to correspond to desired helmet sizes and head sizes a good fit may be made for an unlimited range of head sizes to be accommodated.

In the preferred form of helmet further modules are mounted inside the crown portion 830. Modules 806 mounted within the crown on connecting means 816 are illustrated in FIGS. 8 and 9. In the preferred helmet there are approximately 28 modules around the inside circumference plus approximately eight more modules assembled underneath the crown. Connecting straps 852 or other means to secure the helmet or head gear may also be employed.

Figure 12:
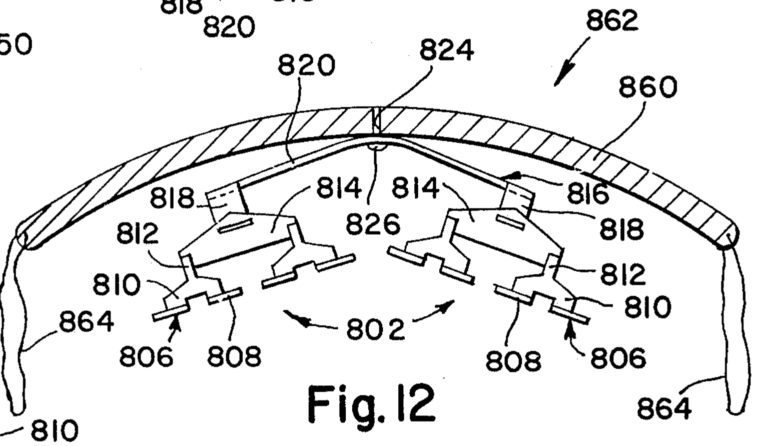

In FIG. 12 another form of the invention, such as a shoulder pad or hip guard, is shown partially in section. All that has been said about the construction of the helmet applies equally to this type of body protection pad or guard. There is a structure means or frame means 860 to which connecting means 816 and modules 806 are attached, as shown in FIG. 12. The pad 862 may have straps 864 or other fastening means to fasten it to the body. The structure shown in FIG. 12 is suitable for knee pads or guards, elbow guards and all other type of body pads or guards. The displaceable bearings 808 of pad 862 are positioned to seat the pad, guard or the like, against a selected body portion of the wearer.

The material out of which the frame or body portion of the head gear or other protective pads is made can be leather, plastic or any of the suitable materials known to the art and while I have described my invention in its preferred forms, there are other forms which it may take without departing from the spirit and scope of the invention and I desire to be protected for all forms coming within the claims hereinbelow.

Wherefore I claim:

1. A cushioning system for a protective head gear, body pad, guard, or the like, comprising a plurality of displaceable bearing means, particular ones of said bearing means being interconnected to others of said bearing means by a first lever type arrangement, so as to define a grouping of bearing means, said first lever type arrangement being operative upon displacement of one of said bearing means in a first direction to apply a force to another of said bearing means in an opposite direction, said bearing means and connected levers being mounted on structure or frame means formed to cover a selected body portion in which selected groupings of interconnected bearing means are further interconnected to other groupings of interconnected bearing means by a second lever type arrangement.

2. The cushioning system as claimed in claim 1, in which at least one group of displaceable bearing means is comprised in a module which includes said lever arrangements.

3. A cushioning system as claimed in claim 2 which comprises a plurality of modules.

4. A cushioning system as claimed in claim 3, in which at least one lever connection includes torsion means.

5. A cushioning system as claimed in claim 4, in which at least one lowermost lever comprised in a module is connected to connection means for connection to the structure, or frame, means.

6. A cushioning system as claimed in claim 5, in which there are a plurality of modules at least one of which is connected through its lowermost lever to an arm of the connecting means.

7. A cushioning system as claimed in claim 6, in which the connecting means is in the form of a strip with a plurality of pairs of arms extending laterally.

8. A cushioning system as claimed in claim 7, in which a plurality of modules are connected to a plurality of connecting means arms.

9. A cushioning system as claimed in claim 8, in which the connecting means is fastened to the structure, or frame, means at points between pairs of connecting arms.

10. A cushioning system as claimed in claim 9, in which the connecting means is comprised of a springy material.

11. A protective head gear such as a helmet, or the like, comprising the cushioning system as claimed in claim 10, in which the structure, or frame means is formed to fit over a portion of the top of a wearer's head, in which there is head seating means formed from at least one module positioned within the frame means at an area where head band means would normally be positioned.

12. The protective head gear as claimed in claim 11 which further comprises a crown portion within which at least one module is positioned.

13. A body pad, limb guard, or the like, comprising the cushioning system as claimed in claim 10, in which the structure, or frame, means is formed to fit a selected portion of the body of the wearer, with at least one module positioned to seat the pad, guard, or the like, against the selected body portion of the wearer.

14. The cushioning system as claimed in claim 1, in which the first lever type arrangement is included in at least one system branching out from a lowermost lever up to a plurality of said displacement bearing means, said branch system comprising branched levers comprising branches having divergent outer ends and common inner ends, with at least one branched lever positioned with its common inner branch ends in juxtaposition to the outer end of another branch in the system, with at least one pair of common inner branch ends of a branched lever forming fulcrum area means, in which at least one of the branches comprises springy material and at least one of the divergent outer ends includes torsion means to permit rotation of fulcrum area means at juxtaposed branch common inner ends, and at least one branched lever comprises displaceable bearing means at its divergent outer ends, whereby displacement of at least one of said displaceable bearing means in a first direction will apply a force to at least one other lever connected displaceable bearing means in an opposite direction.

* * * * *